US007377739B2

(12) United States Patent
Hedley et al.

(10) Patent No.: US 7,377,739 B2
(45) Date of Patent: May 27, 2008

(54) JIG ASSEMBLY

(75) Inventors: Robert Ian Hedley, Milbrodale via Singleton (AU); Scott Andrew Johnson, East Maitland (AU)

(73) Assignee: Justoy Pty Ltd., New South Wales (AU)

( * ) Notice: Subject to any disclaimer, the term of this patent is extended or adjusted under 35 U.S.C. 154(b) by 335 days.

(21) Appl. No.: 11/166,847

(22) Filed: Jun. 24, 2005

(65) Prior Publication Data

US 2006/0171797 A1 Aug. 3, 2006

Related U.S. Application Data

(63) Continuation-in-part of application No. 10/105,920, filed on Mar. 25, 2002, now abandoned, which is a continuation-in-part of application No. 09/342,613, filed on Jun. 29, 1999, now abandoned.

(30) Foreign Application Priority Data

Jul. 3, 1998 (AU) ................................ PP4497/98

(51) Int. Cl.
*B62B 1/00* (2006.01)
*B66F 9/10* (2006.01)

(52) U.S. Cl. ...................... 414/483; 414/427; 414/633; 414/637; 248/278.1

(58) Field of Classification Search ........ 414/427–429, 414/482, 483, 544, 729, 732–738, 912, 917, 414/628, 632, 633, 637; 248/278.1, 288.31
See application file for complete search history.

(56) References Cited

U.S. PATENT DOCUMENTS

| | | | | | |
|---|---|---|---|---|---|
| 3,893,580 | A * | 7/1975 | Stevens | ...................... | 414/632 |
| 4,432,252 | A * | 2/1984 | Brucher | ...................... | 74/469 |
| 4,617,853 | A * | 10/1986 | Wagenseil et al. | ............ | 91/505 |
| 5,498,121 | A * | 3/1996 | Todo et al. | ................. | 414/719 |
| 5,584,646 | A * | 12/1996 | Lewis et al. | ................ | 414/738 |
| 6,010,294 | A * | 1/2000 | Lyddon | ....................... | 414/23 |
| 6,244,643 | B1 * | 6/2001 | Tillaart | .................... | 294/86.41 |
| 2002/0150453 | A1 * | 10/2002 | Hedley et al. | .............. | 414/426 |
| 2004/0262474 | A1 * | 12/2004 | Boks et al. | .............. | 248/276.1 |

FOREIGN PATENT DOCUMENTS

| | | |
|---|---|---|
| DE | 1017535 | * 10/1957 |
| DE | 3916086 | * 11/1989 |
| GB | 2203722 | * 10/1988 |
| JP | 3-128900 | * 5/1991 |
| SU | 1038219 | * 8/1983 |
| SU | 1186636 | * 4/1984 |

* cited by examiner

*Primary Examiner*—Peter M. Cuomo
*Assistant Examiner*—Evan Langdon
(74) *Attorney, Agent, or Firm*—Cesari and McKenna, LLP

(57) ABSTRACT

A jig assembly which includes a universal joint to enable three-dimensional movement of a workpiece or handling device attached thereto. The assembly is particularly useful for enabling translation and rotational movement of heavy machinery and components for servicing and maintenance. The jig assembly may comprise one or more ball joints which may be moved by actuators such as hydraulic cylinder. The assembly may be provided on its own movable frame, or it may be attached to a front end of a loader.

4 Claims, 13 Drawing Sheets

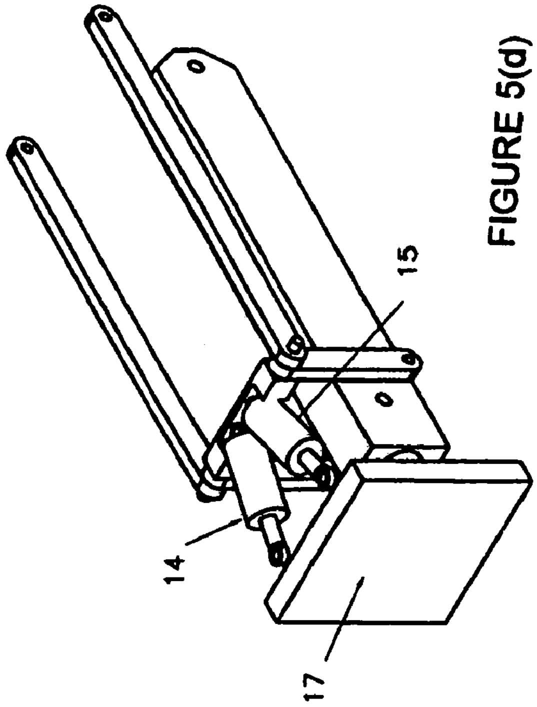
FIGURE 5(d)
FIGURE 5(a)
FIGURE 5(b)
FIGURE 5(c)
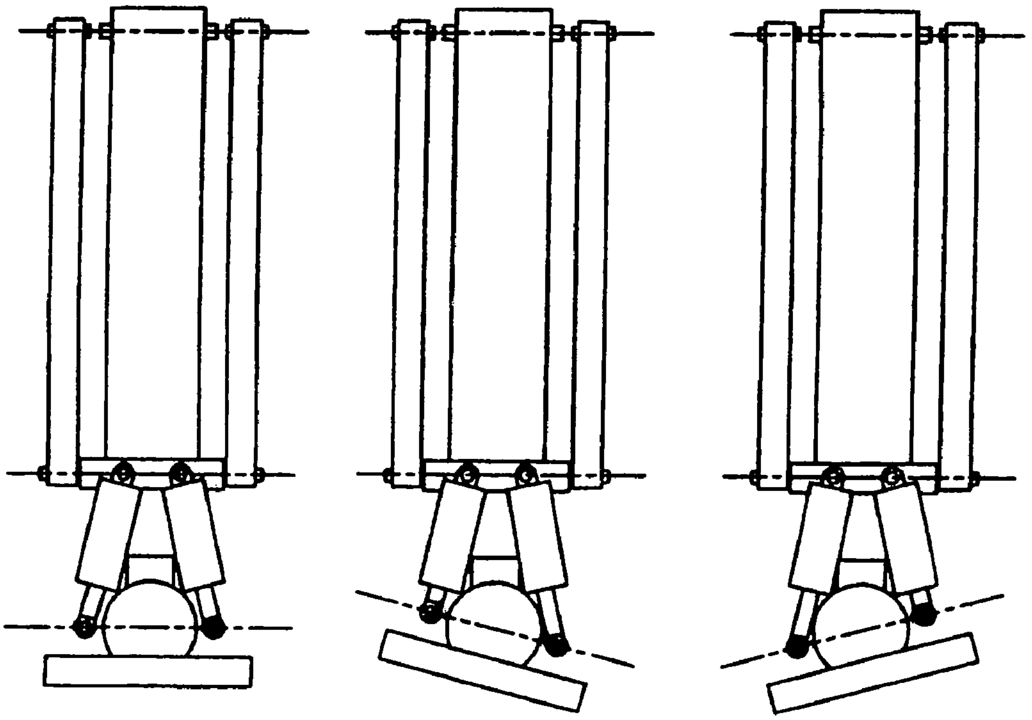

JIG ASSEMBLY

RELATED APPLICATION

This application is a continuation-in-part of Ser. No. 10/105,920, filed Mar. 25, 2002, now abandoned, which is a continuation-in-part of Ser. No. 09/342,613, filed Jun. 29, 1999, now abandoned.

BACKGROUND OF THE INVENTION

The present invention relates to a jig assembly, and in particular, to a jig assembly which includes a universal joint to enable precise positioning relative to a work piece.

DESCRIPTION OF THE PRIOR ART

Various types of jig assemblies are currently known which are used to locate and hold work pieces and/or to guide cutting tools in the manufacture of various devices the servicing of machinery and other equipment, etc. In such applications, often the work to be held is of cumbersome size and/or weight and/or the work piece or tool is required to be provided in an awkward and/or fairly inaccessible location. Presently known jig assemblies usually comprise a movable frame (i.e. supported on wheels) with hydraulic cylinders attached to arms, wherein the ends of the arms may be located proximal to the work by activation of the hydraulic cylinders. A number of sequential operations often have to be performed to locate such a jig in the desired position. For example, when the jig needs to be moved to a different angular disposition, it is has to be separately moved, up or down, sidewards and also back or forth. Often, in the process of moving it closer in one dimension further disalignment in one or other of the other two dimensions occurs. Consequently, the separate movement in each dimension often has to be performed a number of times prior to the jig being provided in the desired location.

SUMMARY OF THE INVENTION

The present invention seeks to provide a jig assembly which overcomes the disadvantages of prior art jig assemblies.

The present invention seeks to provide a jig assembly which incorporates a universal joint in the head of the device such that alignment of the head to the desired work is enabled more expeditiously.

In one broad form, the present invention provides a jig assembly, including a frame supporting a head, characterized in that the head includes a universal joint for precise positioning to a work piece.

Preferably, the universal joint comprises a ball joint.

Alternatively, but also preferably, the universal joint comprises a pair of ball joints, a first of the ball joints being a load bearing ball joint and a second of the ball joints being a guide ball joint.

Most preferably, the ball joints is/are movable by actuation of one or more hydraulic cylinder or the like.

In a preferred form, the ball joints is/are supported by at least one arm extending from a main frame member.

Also preferably, movement of the universal joint and/or jig assembly is controlled from a remote position.

In a preferred embodiment, the present invention further includes a handling device for attachment to the jig assembly to enable full 3 dimensional rotations and translational control and the ability to tip a wheel motor or final drive on end for servicing or maintenance.

In one form, the handling device is a device to handle a type of earthmoving, mining, or like equipment.

In a further form, the handling device is a fork lift device.

In yet a further form, the handling device is a device for handling a front wheel hub of a mining, earthmoving, or like equipment.

In yet a further form, the handling device is a cylinder clamp.

In yet a further form, the handling device is a wheel motor handler for handling a wheel motor of a mining, earthmoving, or like equipment.

In a further broad form, the present invention provides an apparatus for handling heavy articles, including:

a mobile base frame for movement of said apparatus over a substrate surface;

a support frame extending upwards from said base frame;

first alignment means, to effect side-to-side alignment relative to said support frame, said first alignment means being formed of a plate member provided substantially parallel to and spaced apart from said support frame by a pair of interconnecting members, side-to-side alignment being effected by pivotal connections provided between said support frame, said plate member and said interconnecting members;

second alignment means, to effect vertical alignment relative to said first alignment means, said second alignment means being formed of a pair of outwardly extending arms pivotally connected to said plate member and also linked at their remote ends to form a parallelogram configuration; and, having actuation means to effect pivotal rotation of said arms relative to said plate member; and, a head supported by said second alignment means, the head including a universal joint or ball joint adapted to support said heavy article, the head able to be raised or lowered and be moved side-to-side while being maintained in vertical and horizontal alignment, the universal joint comprising a load bearing ball joint and a guide ball joint.

Preferably, the apparatus is as described above, wherein said plate member of said first alignment means is moved relative to said support frame by one of more hydraulic cylinder.

Also preferably, the apparatus is as described above, wherein:

vertical rotation of said head is effected by operation of a vertical rotation cylinder to cause rotation about the horizontal axis of said universal joint; and horizontal rotation of said head is effected by operation of a horizontal rotation cylinder to cause rotation about the vertical axis of said universal joint.

Also preferably, the apparatus is as above, wherein movement of at least one of said universal joint and jig assembly is controlled from a remote position.

BRIEF DESCRIPTION OF THE DRAWINGS

The present invention will become more fully understood from a following detailed description of a preferred by non-limiting embodiment thereof, described in connection with the accompanying drawings wherein:

FIG. 4(*b*) shows the tilt function in a rearward tilt position;

FIG. 4(*c*) shows the tilt function in a forward tilt position;

FIG. 4(*d*) shows the double parallelogram configuration;

FIG. 5(*a*) shows the turn function in a neutral position;

FIG. 5(*b*) shows the turn function in a right position;

FIG. 5(*c*) shows the turn function in a left position'

FIG. 5(*d*) shows an isometric view of the schematic control mechanism;

FIG. 6(*b*) shows a front view of the rotation mechanism;

FIGS. 6(*c*) and 6(*d*) illustrate operation of the rotation mechanism;

FIG. 7(*b*) shows a front view of the tire handler device connected to the head;

FIG. 7(*c*) shows a top view of the tire handler device connected to the head;

FIG. 7(*d*) shows a side view of the tire handler device connected to the head;

FIG. 8(*b*) shows a front view of the fork lift apparatus;

FIG. 8(*c*) shows a top view of the fork lift apparatus;

FIG. 8(*d*) shows a side view of the fork lift apparatus in a lowered position;

FIG. 8(*e*) shows a side view of the fork lift apparatus in an elevated position;

FIG. 9(*b*) shows a front view of the front wheel handling hub connected to the head;

FIG. 9(*c*) shows a top view of the front wheel handling hub connected to the head;

FIG. 9(*d*) shows a side view of the front wheel handling hub connected to the head;

FIG. 10(*b*) shows a front view of a cylinder clamp attachment connected to the head;

FIG. 10(*c*) shows a top view of a cylinder clamp attachment connected to the head;

FIG. 10(*d*) shows a side view of a cylinder clamp attachment connected to the head;

FIG. 11(*b*) shows an end view of a wheel motor handler attached to the apparatus;

FIG. 11(*c*) shows a side view of a wheel motor handler attached to the apparatus;

FIG. 11(*d*) shows the other side view of a wheel motor handler attached to the apparatus;

FIG. 11(*e*) shows an isometric view of the wheel motor and associated handler base attached to the apparatus;

FIG. 11(*f*) shows a side view of the wheel motor and associated handler base attached to the apparatus;

FIG. 11(*g*) shows the other side view of the wheel motor and associated handler base attached to the apparatus;

FIG. 11(*h*) shows an isometric view of the wheel motor handler device in an orthogonal direction connected to the apparatus;

FIG. 11(*i*) shows a front view of the wheel motor handler device in an orthogonal direction connected to the apparatus;

FIG. 11(*j*) shows a top view of the wheel motor handler device in an orthogonal direction connected to the apparatus, and FIG. 11(*k*) shows a side view of the wheel motor handler device in an orthogonal direction connected to the apparatus.

DETAILED DESCRIPTION OF PREFERRED EMBODIMENTS

Throughout the drawings, like numerals will be used to identify similar features, except where expressly otherwise indicated.

Figure 1:
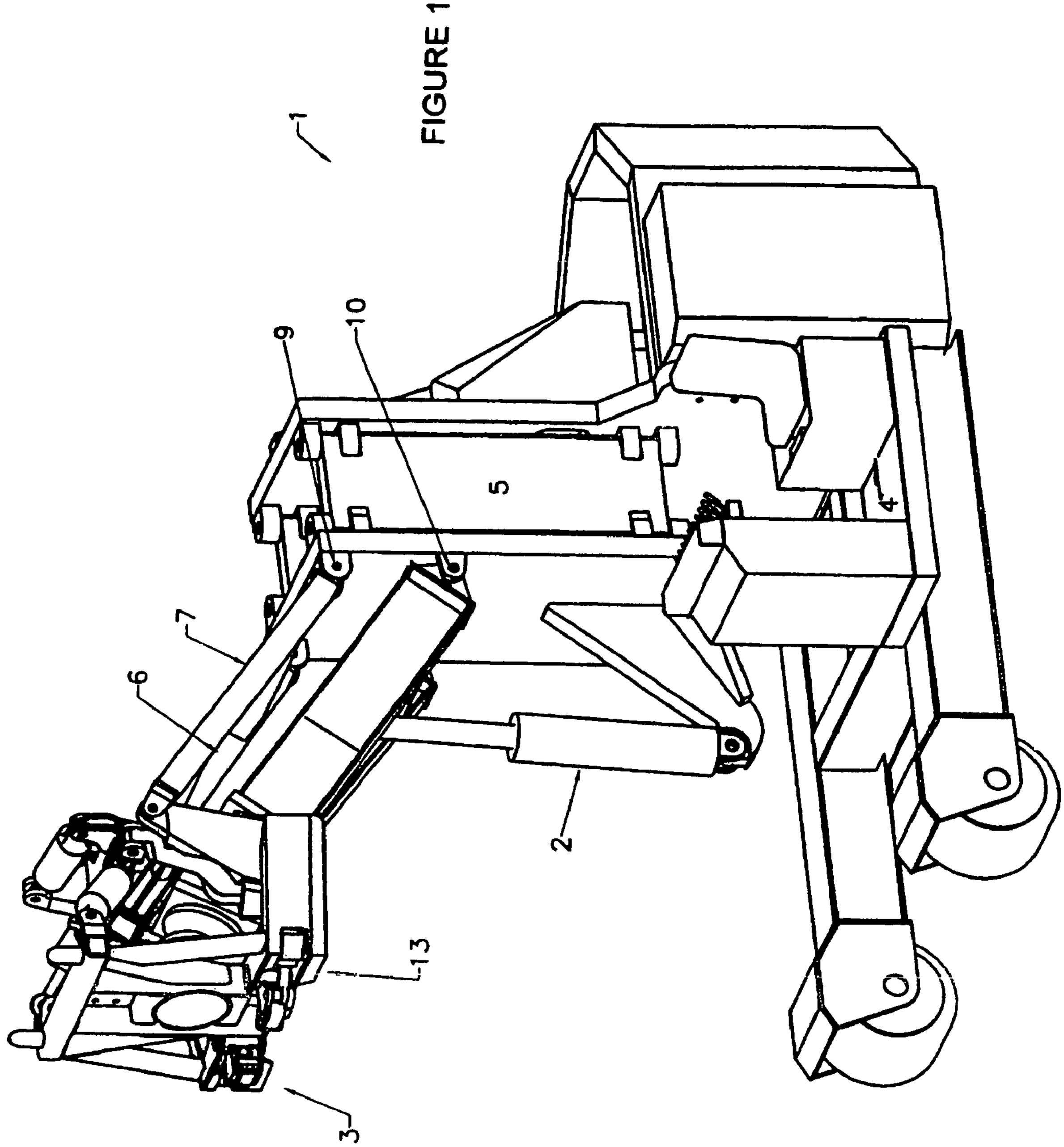
FIG. 1 illustrates an isometric view of the jig assembly in accordance with the present invention.
Figure 2:
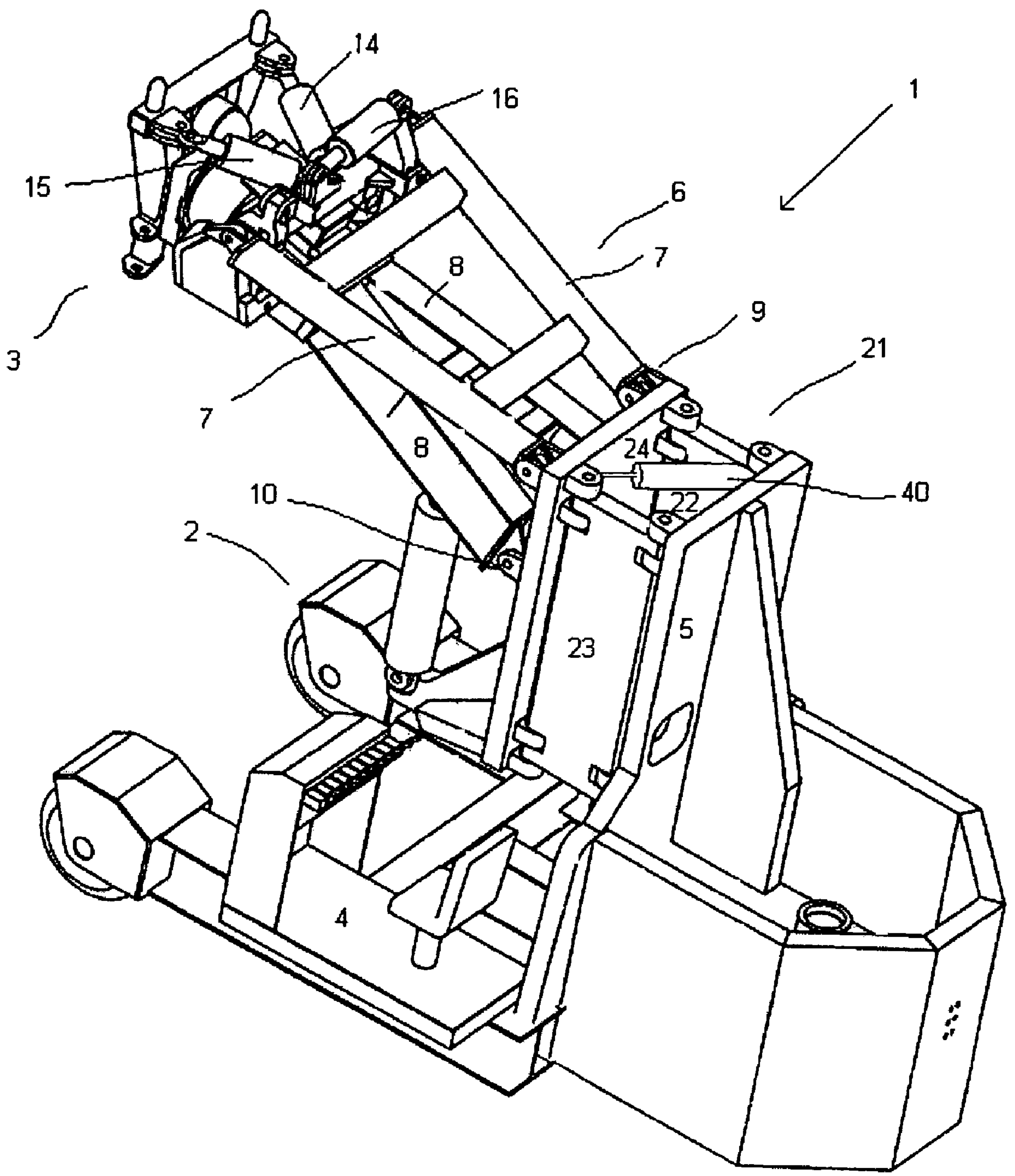
FIG. 2 shows an alternative isometric view of the assembly shown in FIG. 1, to more clearly depict the arrangement of cylinders to effect movement of the head of the assembly.
Figure 3:
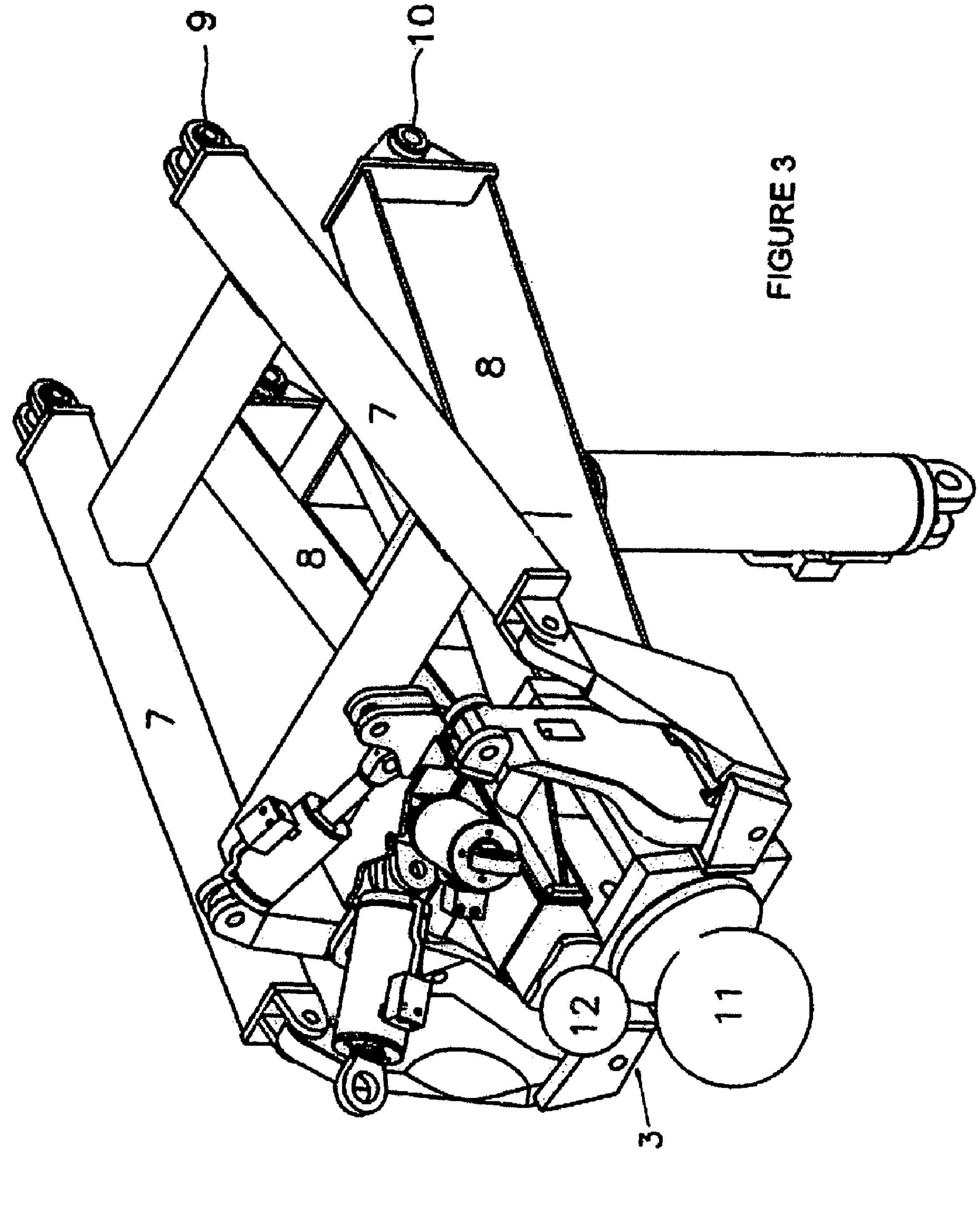
FIG. 3 details the head of the assembly.
Figure 4D:
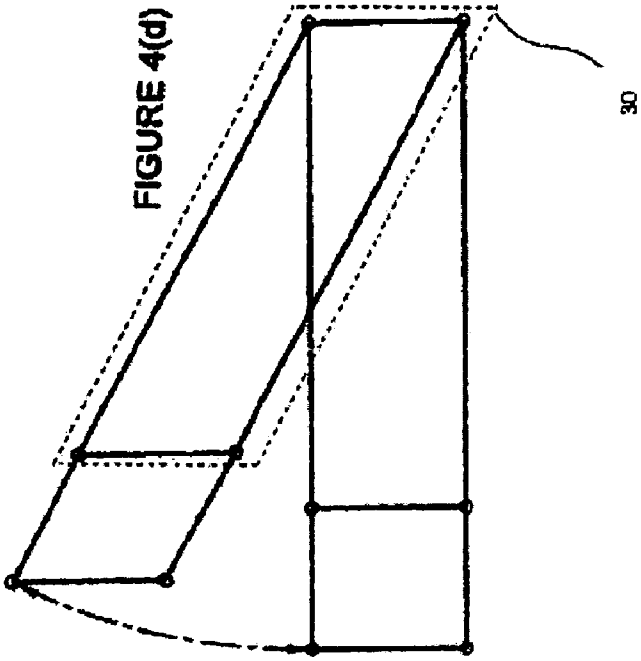
FIG. 4(*a*) shows the tilt function in a neutral position.
Figure 4A:
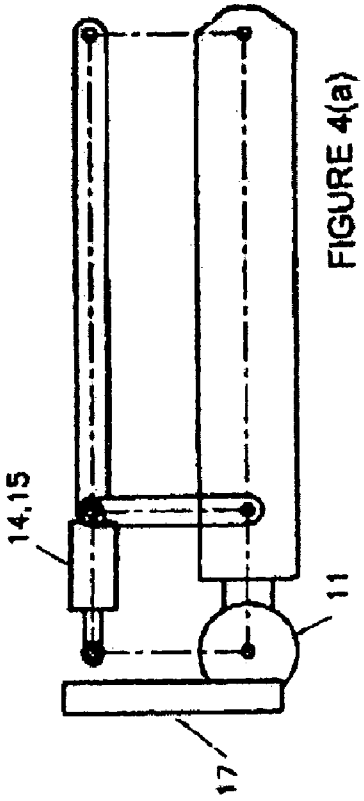
Figure 4B:
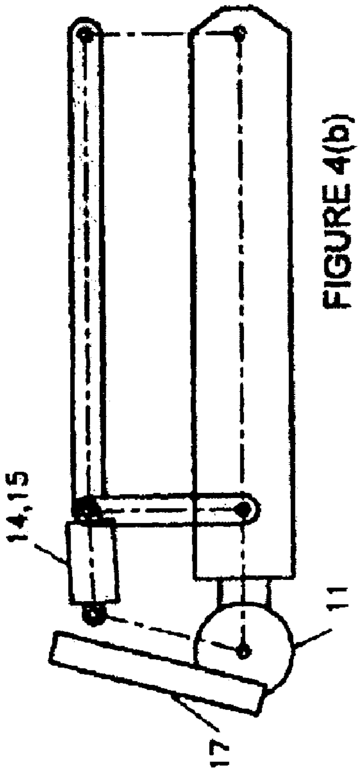
Figure 4C:
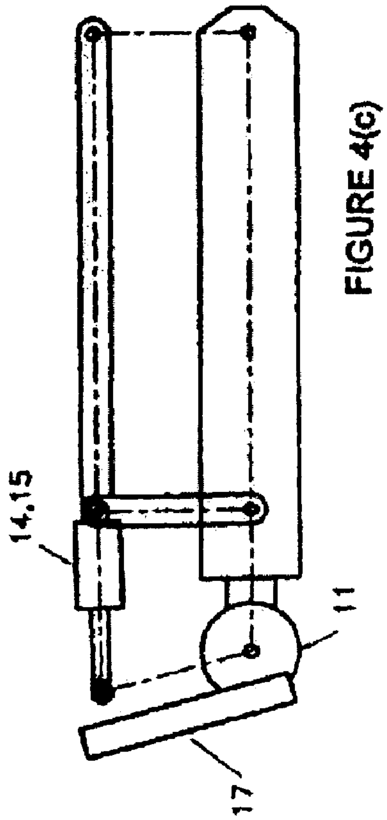
Figure 6A:
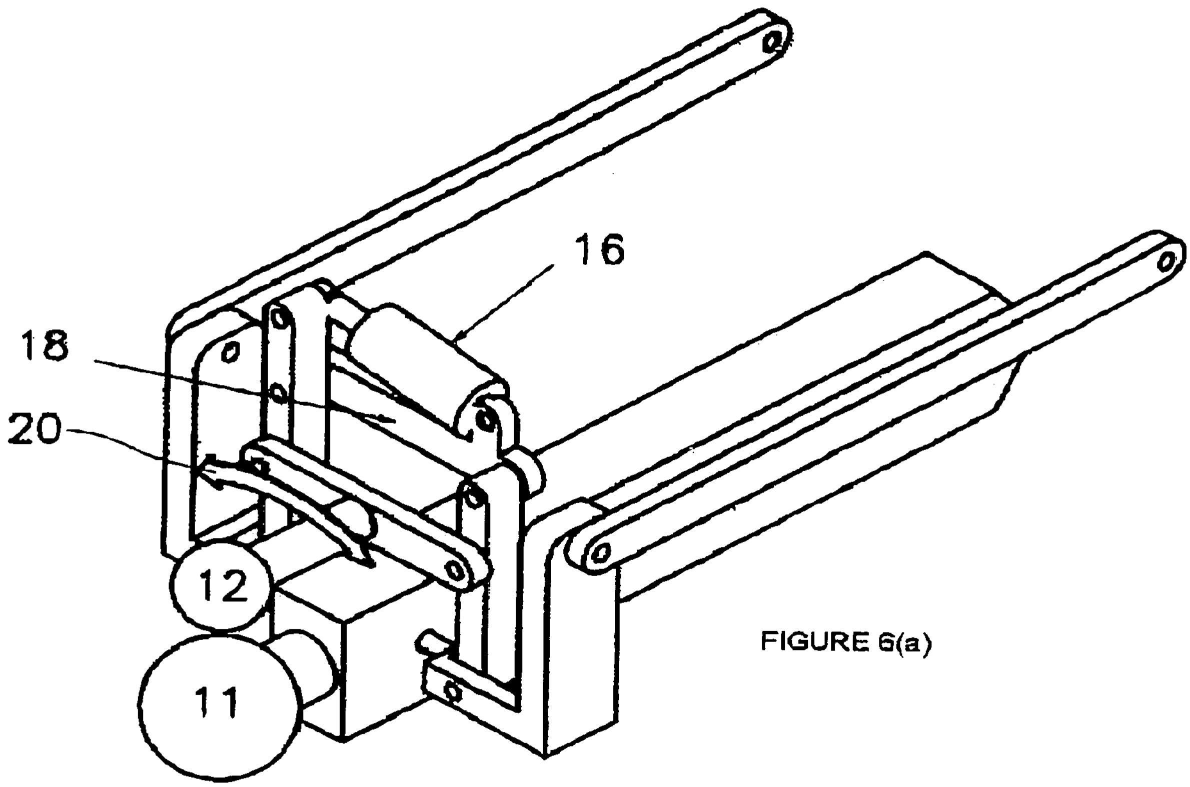
FIG. 6(*a*) shows a perspective view of the rotation mechanism.
Figure 6B:
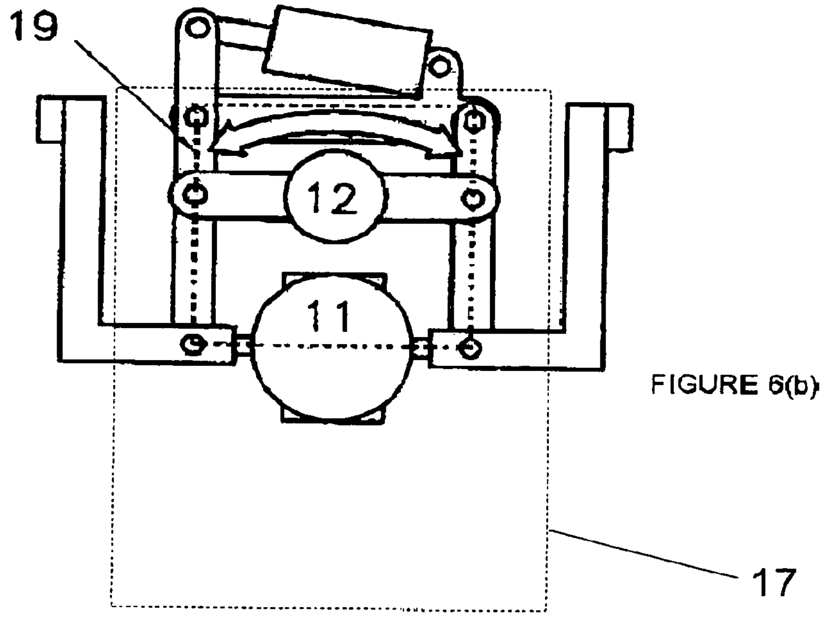
Figure 6C:
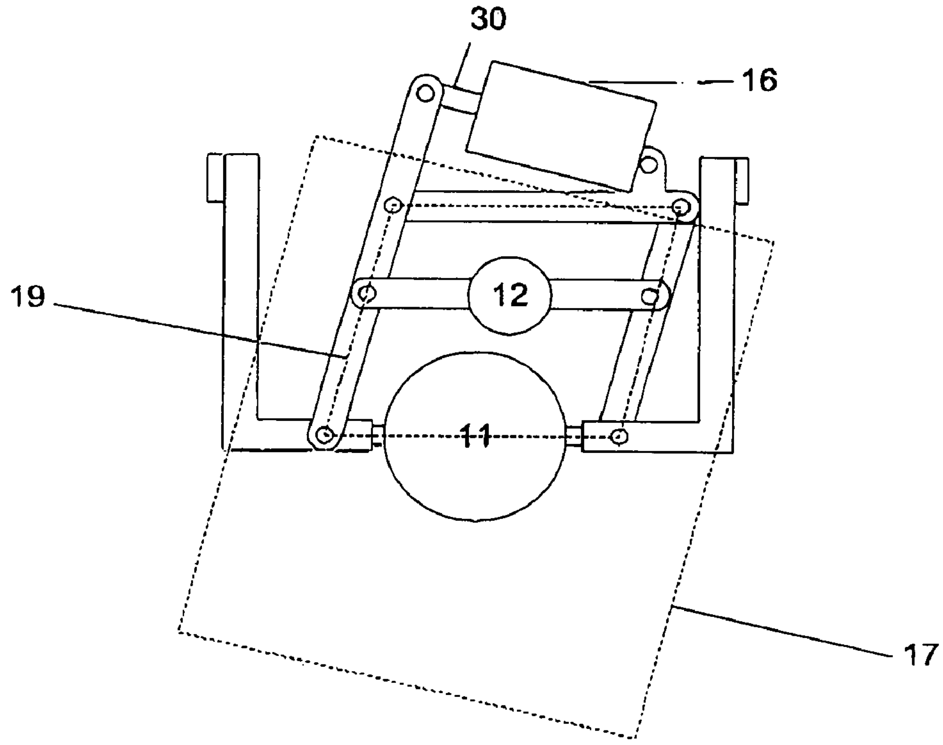
Figure 6D:
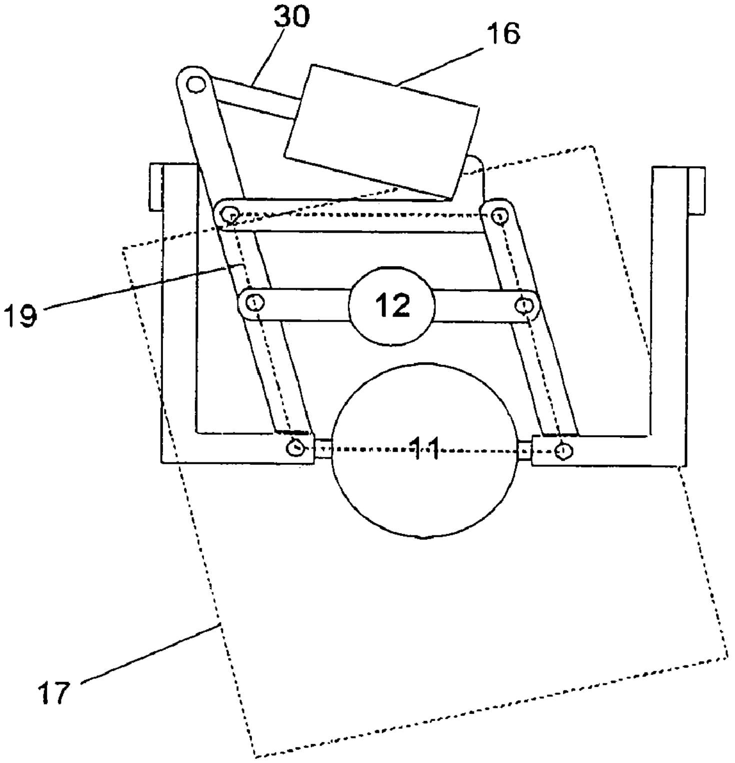
Figure 7C:
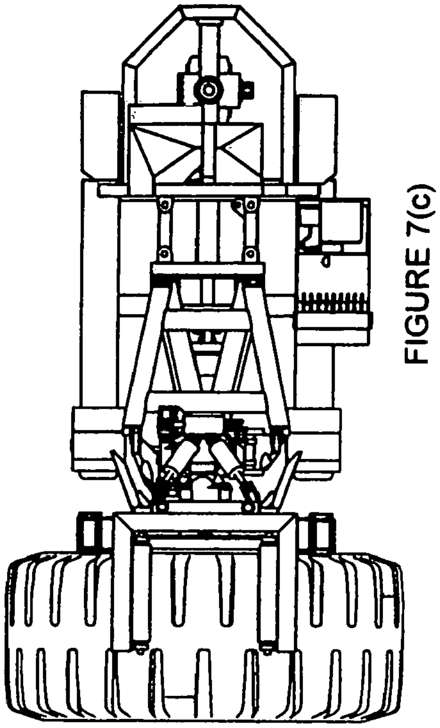
FIG. 7(*a*) shows an isometric view of a tire handler device connected to the head.
Figure 7D:
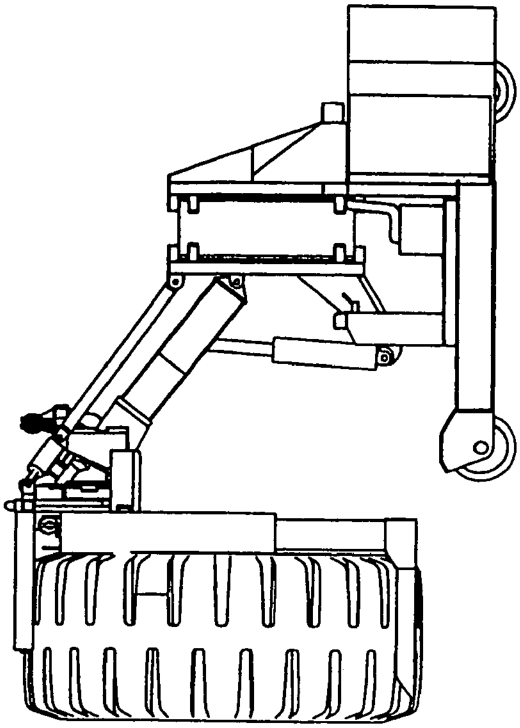
Figure 7B:
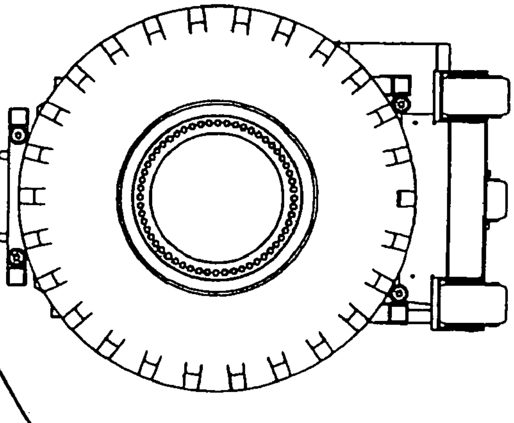
Figure 7A:
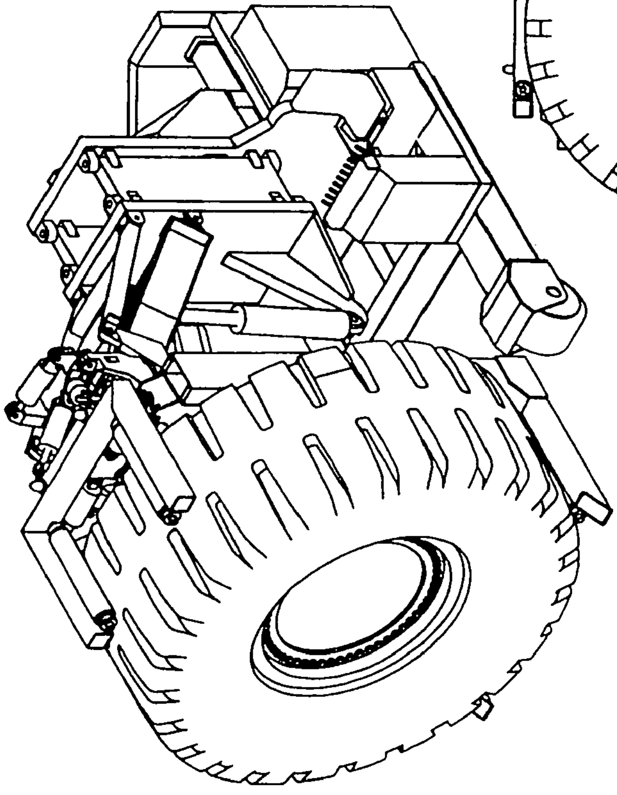
Figure 8C:
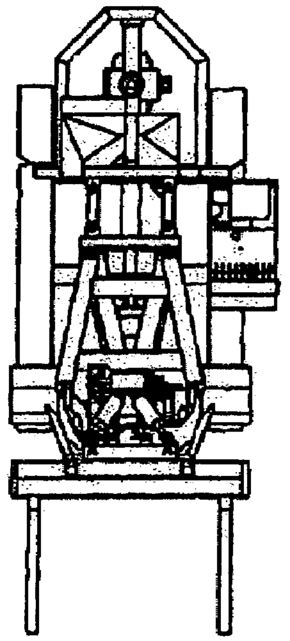
FIG. 8(*a*) shows an isometric view of a fork lift apparatus.
Figure 8E:
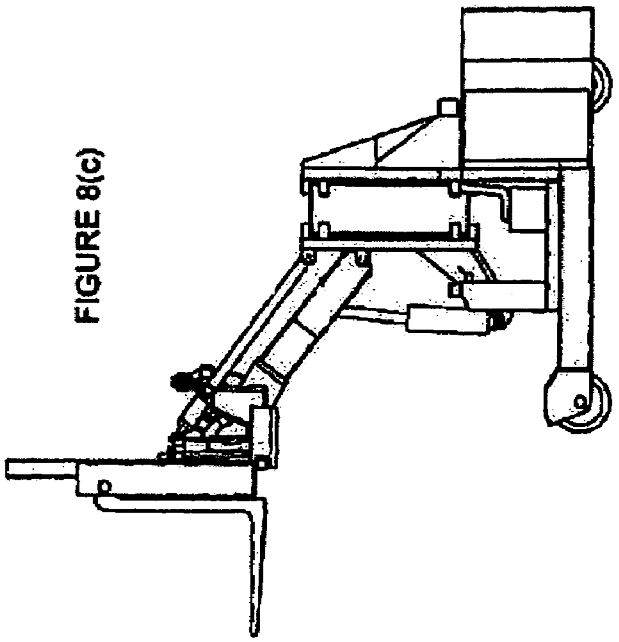
Figure 8A:
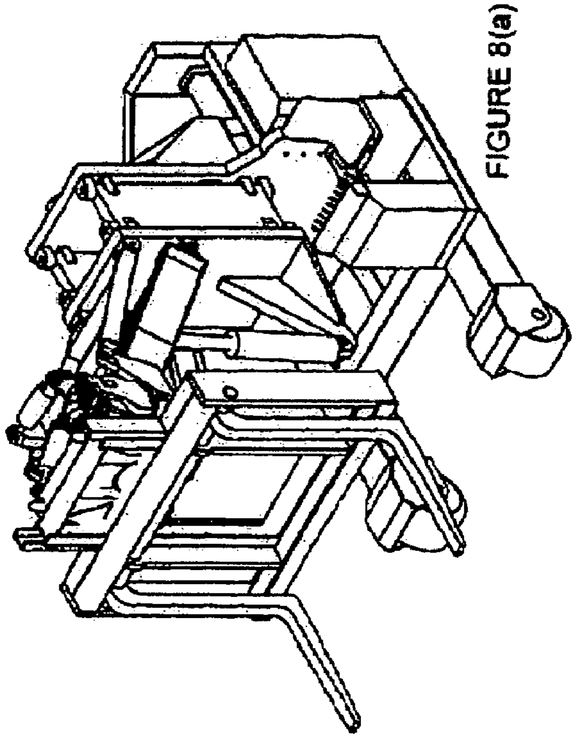
Figure 8D:
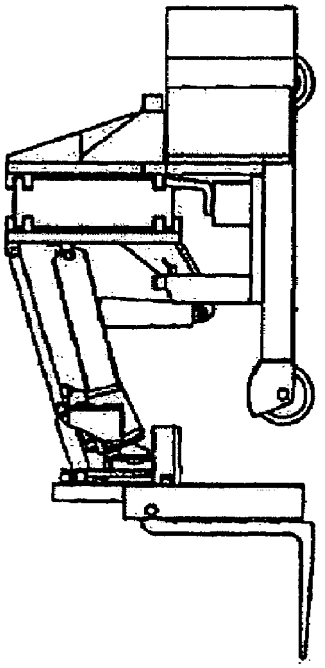
Figure 8B:
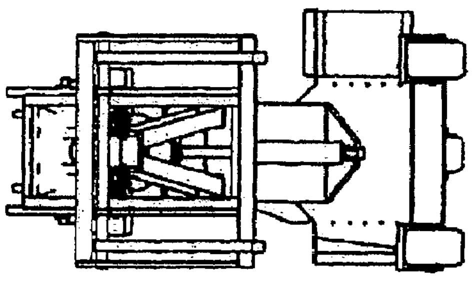
Figure 9C:
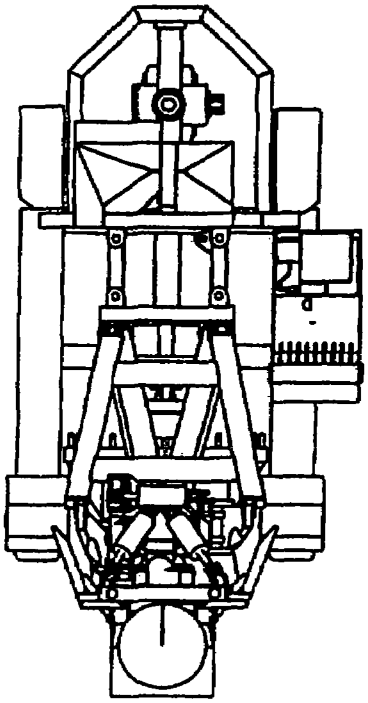
FIG. 9(*a*) shows isometric view of a front wheel handling hub connected to the head.
Figure 9D:
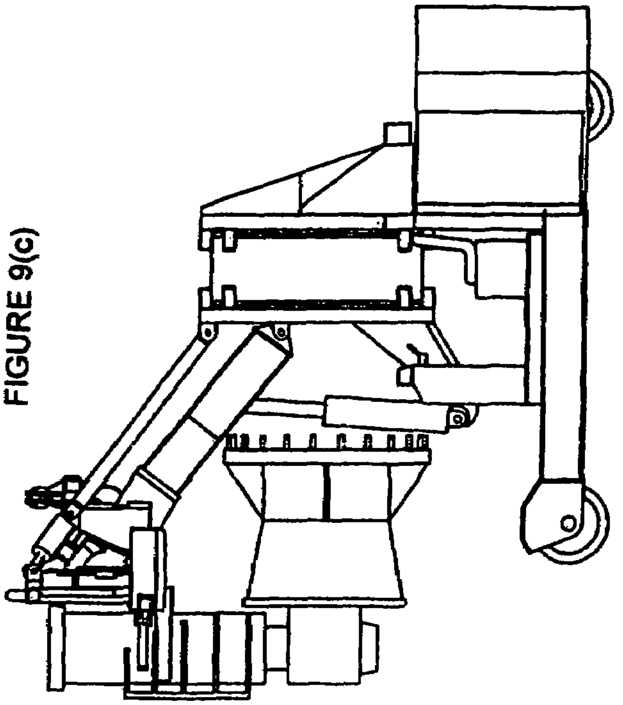
Figure 9B:
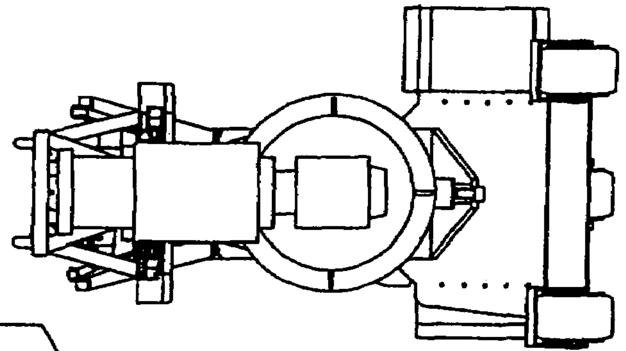
Figure 9A:
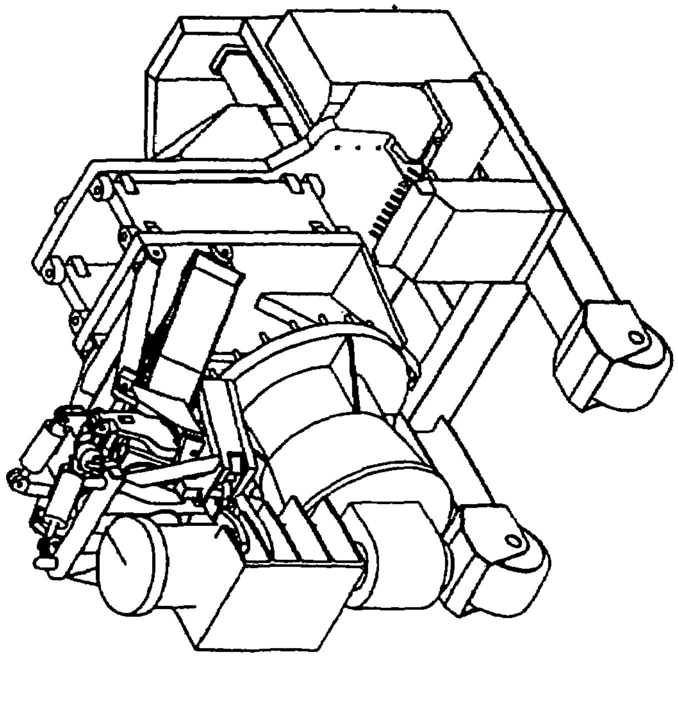
Figure 10C:
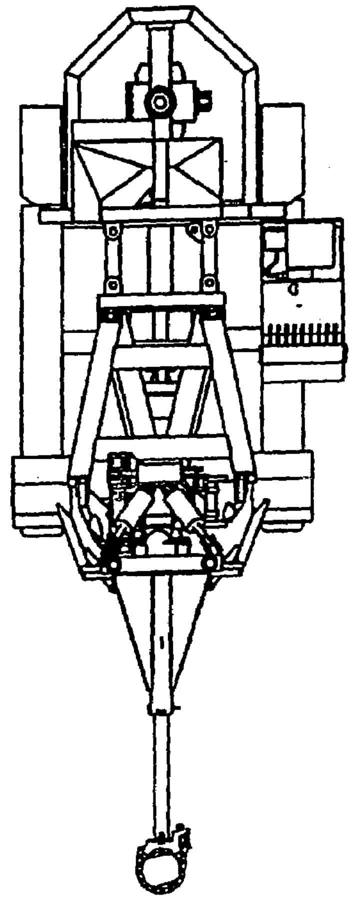
FIG. 10(*a*) shows an isometric view of a cylinder clamp attachment connected to the head.
Figure 10D:
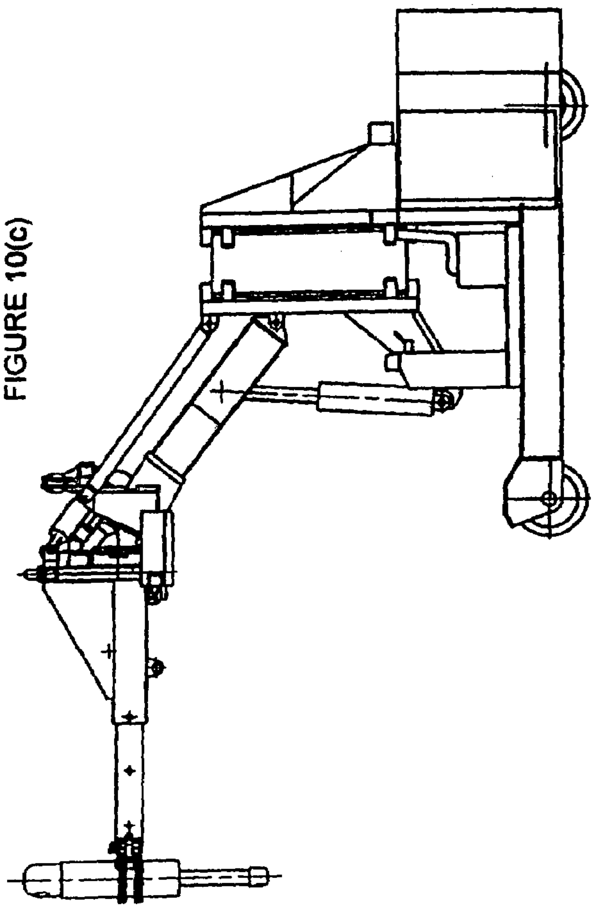
Figure 10A:
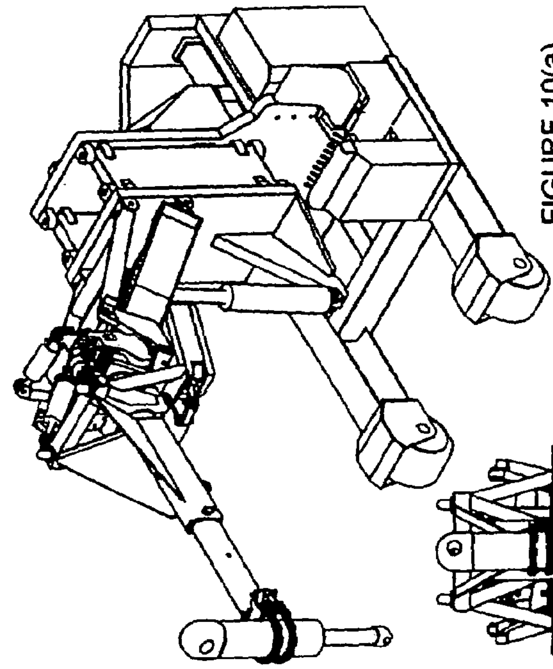
Figure 10B:
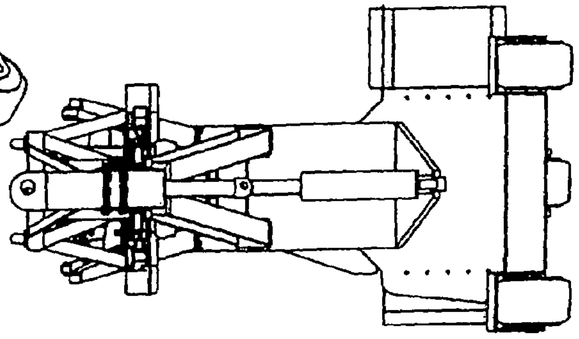
Figure 11A:
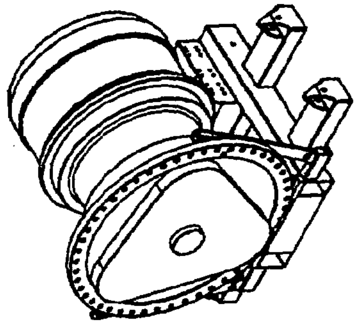
FIG. 11(*a*) shows an isometric view of a wheel motor handler attached to the apparatus.
Figure 11B:
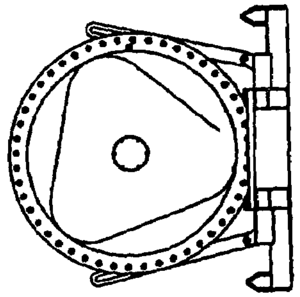
Figure 11C:
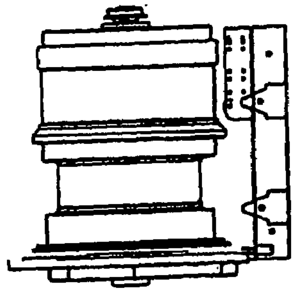
Figure 11D:
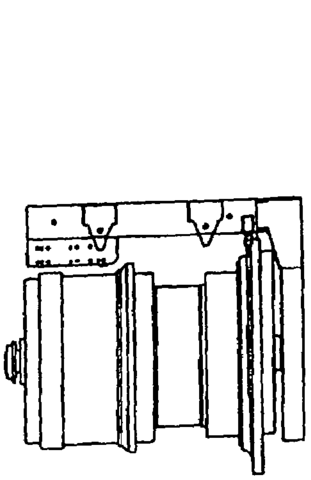
Figure 11E:
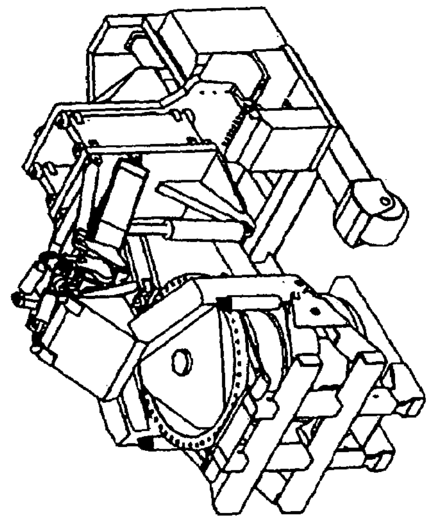
Figure 11F:
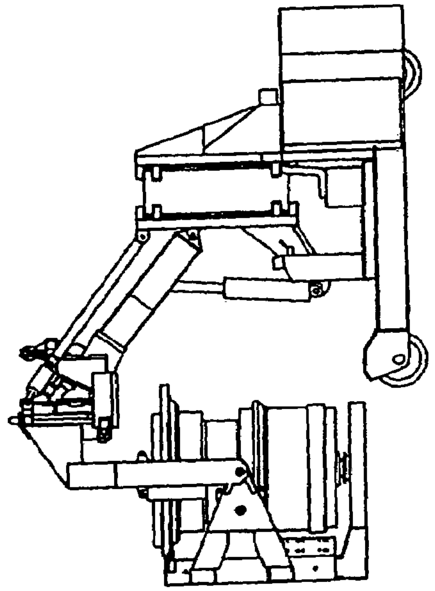
Figure 11G:
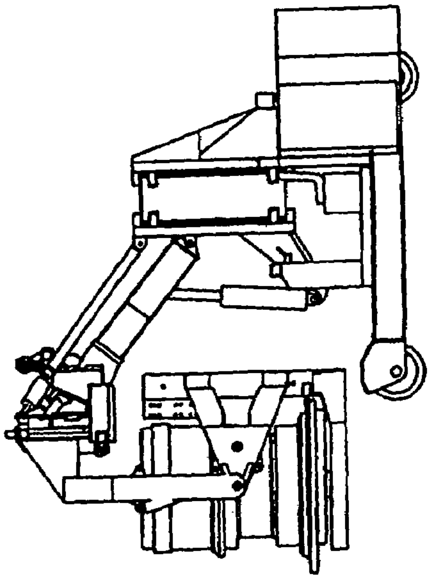
Figure 11J:
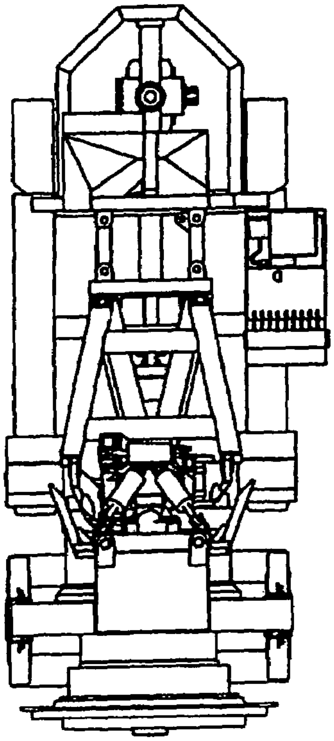
Figure 11K:
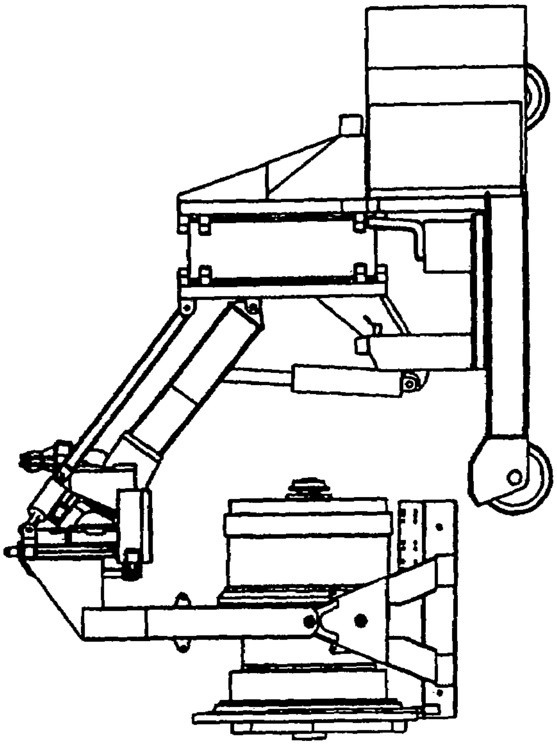
Figure 11I:
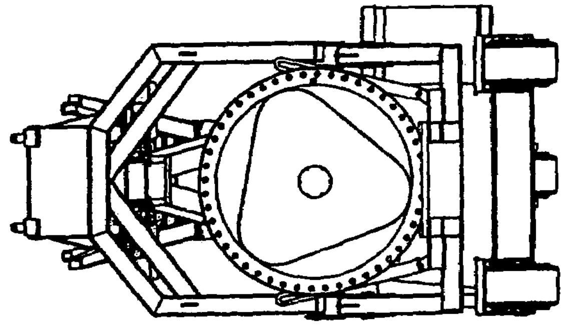
Figure 11H:
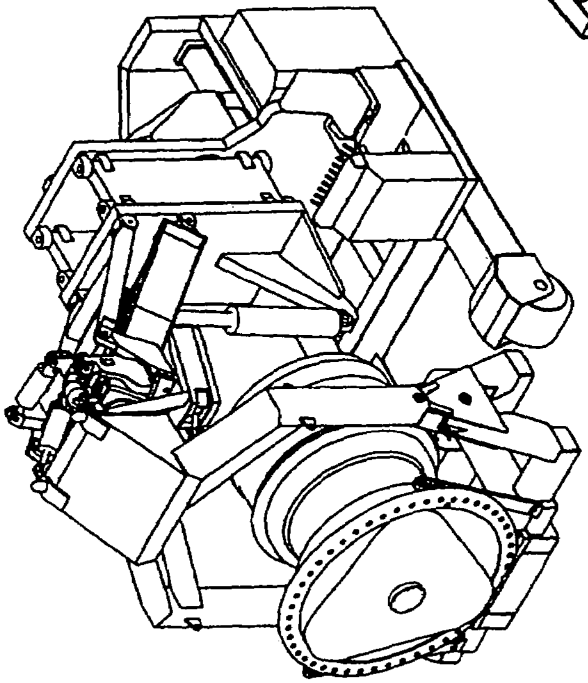

As shown in the drawings, and in particular, in FIGS. 1 to 3, a jig assembly, generally designated by the numeral 1, comprises a support frame 2 and a head 3.

The frame may include a platform like member 4 which may for example be provided on wheels, on a vehicle, or the like, such that it is optionally movable. The device may alternatively be attached to the front end of a loader. Supported on the platform 4 is an upward support frame 5. A first alignment means, to effect side-to-side alignment relative to the support frame 5, is attached thereto. The alignment means, generally designated by the numeral 21, includes a plate member 24 which remains substantially parallel to and spaced apart from the support frame 5 by a pair of interconnecting members 22 and 23. The members 22 and 23 are pivotally connected to the support frame 5 and plate member 24 parallel to the frame 5. Relative movement may be enabled by hydraulic cylinders 40 or the like. The upper end of the support member 24 has one or more arms 6 extending therefrom. The arms 6, in this case upper arms 7 and lower arms 8, are pivotally connected to the upright frame portion 5 at pivot points 9 and 10 respectively. Movement of the arms 7 and 8 may be effected by operation of one or more hydraulic cylinder such that the head 3 may be moved as desired and be precisely positioned in the transverse and longitudinal directions to be provided adjacent to a work piece, as required. The head comprises a main load bearing ball joint 11 and a guide ball joint 12 supporting the jig attachment 13. It will be understood that by movement of the ball joints 11 and 12, any desired positioning of the jig attachment 13 may be enabled three dimensionally by activation of appropriate cylinders. Details of the operation of cylinders which may be attached to the ball and socket joints are shown in FIGS. 4 to 6, with FIG. 4 illustrating a "tilt" function, FIG. 5 illustrates a turn function of the head components and FIG. 6 illustrating the rotation mechanism. Upwards, downwards, inwards, outwards and sideways movement may therefore be effected by activation of appropriate hydraulic cylinders or the like.

In FIG. 4 is detailed, in schematic form, the "tilt" function. FIG. 4(*a*) shows a neutral position of the two cylinders 14 and 15, whilst FIG. 4(*b*) illustrates the cylinders 14 and 15 retracted such that a rearward tilt is achieved, and FIG. 4(*c*) shows how cylinders 14 and 15 are extended to achieve a forward tilt of head 17. FIG. 4(*d*) illustrates schematically the double parallelogram configuration which enables for the head to be raised and lowered without any lift head tilt angle deviation in the neutral position. The double parallelogram configuration includes the second parallelogram 30.

In FIG. 5 is detailed, in schematic form, the "turn" function. FIG. 5(*a*) is shown the neutral position, wherein the right and left cylinders, 14 and 15, are both at mid stroke, whilst FIG. 5(*b*) shows the right cylinder 14 retracted and the left cylinder extended to tilt the lift head 17 right, and, FIG. 5(*c*) shows the right cylinder extended and the left cylinder retracted to achieve a left turn of the head 17. FIG. 5(*d*) shows an isometric view of the schematic control mechanism, with the rotation mechanism omitted for clarity.

In FIGS. 6(*a*) to 6(*d*) is detailed the rotation mechanism of the assembly of the present invention. The rotation mechanism undergoes movement illustrated schematically by the dotted line, referred to as the third parallelogram 19. This parallelogram constrains both the control cylinder mounts and the small ball to rotate about the centre of the main ball in the directions illustrated by arrow 20. For rotational movement only, the control cylinders 14 and 15 remain at a fixed extension to maintain both the “tilt” and “turn” constant. The third parallelogram is hence rotated by extension or retraction of rotation cylinder 16. This third parallelogram 19 exerts a transverse load through the small ball 12 to produce a torque about the main ball 11 to effect rotation shown by arrows 20.

As shown in FIG. 6(*b*), the head 17 (indicated by the dotted line) is in the normal position due to no rotational movement being applied to the head 17. Additionally, the third parallelogram 19 is undistorted due to no rotational movement having been applied to the head 17 by the rotation cylinder 16. When the rotation cylinder 16 expands or contracts, the length of a piston 30 of the rotation cylinder 16 varies accordingly, causing the third parallelogram 19 to distort (as shown in FIGS. 6(*c*) and 6(*d*) due to the transverse force applied by the rotation cylinder 16. As the third parallelogram 19 distorts, the guide ball 12 rotates relative to the center of the main ball 11. Therefore, due to the head 17 being connected to the load ball 11 and guide ball 12, the rotational movement of the guide ball 12 about the center of the load ball 11 causes the head 17 to rotate in either a clockwise or anticlockwise direction depending on the actuation of the roation cylinder 16.

This rotational movement is exemplified in FIG. 6(*c*) showing clockwise rotational movement of the head 17, and FIG. 6(*d*) showing anticlockwise rotational movement of the head 17.

In FIG. 6(*c*), the rotational cylinder 16 has retracted, thus reducing the exposed length of the piston 30 of the rotational cylinder 16. As the exposed length of the piston 30 reduces, the third parallelogram 19 distorts (as indicated by the dotted line), causing the guide ball 12 to rotate in a clockwise direction about the center of the load ball 11. This rotation of the guide ball 12 about the load ball 11 causes a rotational force to be applied to the head 17, therefore rotating the head 17 in a clockwise direction, as indicated by the dotted line.

In FIG. 6(*d*), the rotational cylinder 16 has expanded, thus increasing the exposed length of the piston 30 of the rotation cylinder 16. As the exposed length of the piston 30 increases, the third parallelogram 19 distorts (as indicated by the dotted line) in an opposite direction as shown in FIG. 6(*c*), causing the guide ball 12 to rotate in an anticlockwise direction about the center of the load ball 11. This rotation of the guide ball 12 about the load ball 11 causes the head 17 to rotate in an anticlockwise direction, as indicated by the dotted line.

FIGS. 7 to 11 show various devices attached to the jig assembly 1 of the present invention.

In FIG. 7, a tire handler device is connected to the head of the jig assembly, with FIG. 7(*a*) showing an isometric view, FIG. 7(*b*) showing a front view, FIG. 7(*c*) showing a top view and FIG. 7(*d*) showing a side view. As will be appreciated, the jig assembly is particularly useful for changing such tires of large dimensions of earthmoving, mining and other equipment.

In FIG. 8, a fork lift device is shown attached to the head of the jig assembly. FIG. 8(*a*) illustrates an isometric view of the fork lift apparatus, FIG. 8(*b*) illustrates a front view, FIG. 8(*c*) shows a top view and FIG. 8(*d*) shows a side view with the fork lift in a lowered position. FIG. 8(*e*) shows a side view with the fork lift in an elevated position. Such a fork lift has advantages over conventional fork lift devices in that fine adjustment of the positioning of the fork lift attachment is more readily made without the necessity to relocate the entire assembly.

In FIG. 9, a front wheel hub handling, typically useful in servicing earthmoving and mining equipment is illustrated, with FIG. 9(*a*) showing an isometric view, FIG. 9(*b*) showing a front view, FIG. 9(*c*) showing a top view and FIG. 9(*d*) showing a side view.

In FIG. 10, a cylinder clamp attachment is shown attached to the jig assembly of the present invention, FIG. 10(*a*) showing an isometric view, FIG. 10(*b*) showing a front view, FIG. 10(*c*) showing a top view and FIG. 10(*d*) showing a side view. It will be appreciated that the cylinder can be grasped and moved as desired for servicing and the like.

FIG. 11 illustrates a wheel motor handler shown attached to the jig assembly of the present invention. Firstly, in FIGS. 11(*a*) to 11(*d*) is illustrated various views of the wheel motor attached to a handler base which can be used as a transportation pallet, with FIG. 11(*a*) showing an isometric view, FIG. 11(*b*) showing an end view, FIG. 11(*c*) showing a side view, and FIG. 11(*d*) showing another side view with the base tipped onto one end—useful for servicing or maintenance. FIGS. 11(*e*) to 11(*g*) then show the wheel motor and its associated handler base attached to the jig assembly, with FIG. 11(*e*) showing an isometric view of the assembly with the wheel motor rotated forward, FIG. 11(*f*) showing a side view of the assembly with the wheel motor rotated forward and FIG. 11(*g*) showing a side view with the wheelmotor rotated backwards. FIGS. 11(*h*) to 11(*k*) then show further views of the wheel motor handler device connected to the jig assembly, but with the wheel assembly and its handler base rotated in an orthogonal direction to that shown in FIGS. 11(*e*) to 11(*g*). That is, FIG. 11(*h*) shows an isometric view, FIG. 11(*i*) shows a front view, FIG. 11(*j*) shows a top view and FIG. 11(*k*) shows a side view.

The advantage of the present invention is primarily achieved by use of one or more ball joints, as illustrated. Two joints are utilized in the present embodiment, one as the load bearing joint, and one as a guide. It will however be appreciated by persons skilled in the art, that these may be embodied in one universal joint. Other types of universal joint may be used, however, it is anticipated that a ball and socket type joint whereby a ball is embraced by spherical cup like device is the preferred type of universal joint to permit the required relative angular movement it any plane.

It will be appreciated that the present invention is particularly useful for holding tools, or for holding heavy and awkwardly positioned work pieces during repair/maintenance/installation.

While the present invention has been hereinbefore described with reference to a particular embodiment, it will be understood that numerous variations and modifications will be envisaged by persons skilled in art. All such variations and modifications should be considered to fall within the scope of the invention as broadly hereinbefore described and as hereinafter claimed.

We claim:

1. An apparatus for handling heavy articles, including:

a mobile base frame for movement of said apparatus over a substrate surface;

a support frame extending upwards from said base frame;

first alignment means, to effect side-to-side alignment relative to said support frame, said first alignment means being formed of a plate member provided substantially parallel to and spaced apart from said support frame by a pair of interconnecting members, side-to-side alignment being effected by pivotal connections provided between said support frame, said plate member and said interconnecting members;

second alignment means, to effect vertical alignment relative to said first alignment means, said second alignment means being formed of a pair of outwardly extending arms pivotally connected to said plate member and also linked at their remote ends to form a parallelogram configuration, and having actuation means to effect pivotal rotation of said arms relative to said plate member;

a head supported by said second alignment means, the head including a universal joint or ball joint adapted to support said heavy article, the head able to be raised or lowered and be moved side-to-side while being maintained in vertical and horizontal alignment; and, wherein said universal joint comprises a pair of ball joints, a first of the ball joints being a load bearing ball joint and a second of the ball joints being a guide ball joint, such that the guide ball joint rotates about the load bearing joint to allow rotation of the head.

2. An apparatus as claimed in claim 1, wherein said plate member of said first alignment means is moved relative to said support frame by at least one hydraulic cylinder.

3. An apparatus as claimed in claim 1 or 2, wherein:

vertical rotation of said head is effected by operation of a vertical rotation cylinder to cause rotation about the horizontal axis of said universal joint; and horizontal rotation of said head is effected by operation of a horizontal rotation cylinder to cause rotation about the vertical axis of said universal joint.

4. The apparatus defined in claim 1, wherein movement of at least one of said universal joint and ball joint is controlled from a remote position.

* * * * *